United States Patent [19]
Zinnecker

[11] Patent Number: 4,725,033
[45] Date of Patent: Feb. 16, 1988

[54] MOUNTING CHOCK

[76] Inventor: Walter H. Zinnecker, 215 Inwood Dr., Friendswood, Tex. 77546

[21] Appl. No.: 891,272

[22] Filed: Jul. 29, 1986

[51] Int. Cl.⁴ ............................................. B65D 63/00
[52] U.S. Cl. ..................................... 248/499; 248/154; 248/172
[58] Field of Search ............... 248/499, 505, 500, 154, 248/670, 172; 410/2, 77, 94, 101; 296/40; 224/318, 329, 42, 46 R, 42.39; 108/55.3

[56] References Cited

U.S. PATENT DOCUMENTS

| | | | |
|---|---|---|---|
| 677,566 | 7/1901 | Eaton | 248/154 X |
| 1,520,768 | 12/1924 | Owen | 224/42.39 |
| 2,543,740 | 2/1951 | Ridgely | 248/505 X |
| 3,315,800 | 4/1967 | Wagner | 108/55.3 X |
| 4,367,572 | 1/1983 | Zieleski | 248/505 X |
| 4,487,537 | 12/1984 | Morse | 248/499 X |
| 4,607,990 | 8/1986 | Eggers | 410/101 X |

FOREIGN PATENT DOCUMENTS

| | | | |
|---|---|---|---|
| 15159 | of 1914 | United Kingdom | 224/42.39 |
| 217707 | 6/1924 | United Kingdom | 224/42.39 |

*Primary Examiner*—J. Franklin Foss
*Attorney, Agent, or Firm*—Kurt S. Myers; Ned L. Conley; David A. Rose

[57] ABSTRACT

The present mounting chock is a system of elements designed to allow the chock to conform to non-rectilinear objects and to therefore allow greater flexibility in mounting objects to floors or decks. The invention includes right and left mounting elements, the right and left elements being mirror images in the vertical plane, and a spacing attachment means which is used to locate the right and left mounting elements relative to the mounted object and to each other which together comprise a mounting chock.

9 Claims, 4 Drawing Figures

MOUNTING CHOCK

BACKGROUND OF THE INVENTION

This invention relates generally to the field of mounting and anchoring devices and specifically to mounting chocks.

Typical mounting devices employ single piece angled mounting chocks with limited mounting and configuration potential. These are used in combinations of two or more chocks in conjunction with anchoring cords to mount objects such as ice chests or other bulky cargo to boat decks, or other applications in which the locating and restraint of a bulky object is required. Such conventional chocks are normally of a one piece construction, which limits both the mounting configuration potential as well as the potential for use with nonrectilinear mounted objects. U.S. Pat. No. Des. 268,007 discloses such a device. Use of such chocks may be both inconvenient and at times impossible for many known mounting applications.

SUMMARY OF THE PRESENT INVENTION

The present invention is a mounting system comprising mounting chocks of the compact design of the present invention and a securing element which together provide greater mounting and configuration possibilities than the prior art.

The present mounting chock is a system of elements designed to allow the chock to conform to non-rectilinear objects and to therefore allow greater flexibility in mounting objects to floors or decks. The invention includes right and left mounting elements, the right and left elements being mirror images in the vertical plane, and a spacing attachment means which is used to locate the right and left mounting elements relative to the mounted object and to each other which together comprise a mounting chock. A second aspect of my invention is a mounting system comprised of a plurality of mounting chocks and an interspaced securing element which physically anchors the mounted object to the mounting chocks and thereby to the floor or deck. The variety of shapes of objects which may be mounted or secured is made easier by virtue of the many anchoring configurations possible under the present invention.

In a preferred embodiment, the spacing attachment means of the mounting chock is of a thin wall bendable construction which is ribbed. The spacing attachment means engages slots in the vertical attachment face of the right and left mounting elements, which slots are thinner than the ribs which radiate out on the spacing attachment means but thicker than the thin wall. Further, the spacing attachment means may be bent so that the included angle is from less than 90° to approximately 180°. The ribs radiate out in equal pairs on the spacing attachment means from the bend axis which preferably is at the midpoint. The preferred embodiment of the interspaced securing element is an elastic cord which may be secured to and stretched between two anchored mounting chocks. The elastic cord may have at least one mounting hook which engages and secures the mounted object.

DESCRIPTION OF THE PREFERRED EMBODIMENT

Figure 1:
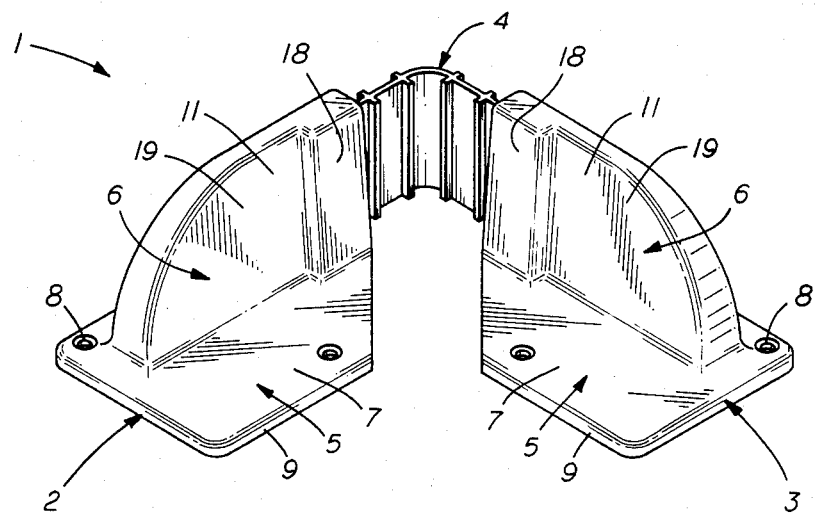
FIG. 1 is a perspective view of the mounting chock in the assembled condition.

With continuing attention to the drawings, the reference number 1 indicates a mounting chock comprised of a left mounting element 2, right mounting element 3 and a spacing attachment means 4.

The left mounting element 2 is comprised of an element anchoring means 5 and a limiting means 6. The element anchoring means 5 is generally in the horizontal plane, when secured to a floor or deck, while the limiting means 6 is in a plane perpendicular to the element anchoring means 5. Element anchoring means 5 is comprised of an anchoring face 7 having mounting means 8, which preferably is an opening for a screw for securing the mounting element 2 to the floor or deck or other surface. Further, an element anchoring means 5 includes anchoring perimeter 9 contoured from the anchoring face 7, which locates the anchoring face 7 off the mounting plane to which the mounting chock 1 is anchored. The limiting means 6, which secures and provides a limiting surface for the mounting object, is comprised of contoured double walls which contour to a common top, the double walls being an interior wall 11 and exterior wall 12 in a perpendicular plane to the anchoring face 7. Walls 11 and 12 form a hollow interior 13 contoured upwardly from one end and at the other end terminating in a vertical attachment face 14. The attachment face 14 contains an attachment slot 15 sized to accept the spacing attachment means 4, and a hook slot 16 sized to accept a securing hook 17. Interior wall 11, in a preferred embodiment, includes an offset face 18, contoured by contour face 19. A stabilizing rib 20 extends from the exterior wall 12 to the anchoring face 7.

The left mounting element 2 and right mounting element 3 are mirror images in the vertical plane. The limiting means 6 of the respective elements 2 and 3 form the interior restraining surfaces for the mounted object.

Spacing attachment means 4 has a thin body 21 adaptable to fit into the vertical attachment slots 14 of left mounting element 2 and right mounting element 3 and may be bent at a bending axis 22. The included angle of the bend may range from about 45° to about 17°. Spacing attachment means 4 also has ribs 23 radiating from the thin body 21 which prevent the spacing attachment means 4 from moving through the attachment slots 15 once the spacing attachment means 4 and mounting elements 2 and 3 are in the assembled condition.

The spacing attachment means 4 provides the flexibility between left mounting element 2 and right element 3 to conform the limiting means 6 of the respective elements 2 and 3 to the exterior shape of the mounted object. The spacing means 4 thus provides a simple and effective holder for the elements 2 and 3 against the exterior shape of the mounted object when marking the positions for the screws for securing the mounting elements 2 and 3 to the mounting surface, such as the floor or deck. When mounting elements 2 and 3 are fully secured, the elements 2 and 3 together with the spacing attachment 4 provide a mounting chock 1 which precisely conforms to the exterior shape of the mounted object. To secure an object or to mount an object, two or more mounting chocks 1 are used. For example, if a round object is secured, two or three mounting chocks 1 may be employed. Because of the flexibility due to the fact that the spacing attachment means 4 and be bent, two mounting chocks 1 may be sufficient. If the object is rectangular, two to four mounting chocks 1 may be employed. Best results are obtained when pairs of mounting chocks 1 are employed together with a securing element 24. The securing element 24 has securing hooks 17 at either end which all attach respectively to the hook slot 16 in a element 2 or 3 of one mounting chock 1 and the hook slot 16 of another mounting chock 1. The securing element 24 is normally constructed of a elastic material, such that it stretches between the points of attachment with each mounting chock and stretches tightly over the mounted object or securing element 24 may be attached to the mounted object 25. This attachment is accomplished preferably by virtue of a mounting hook 26, which is comprised of a hook 27 and sliding member 28. With such an arrangement, the hook member 27 may be deployed at any point on the securing element 24.

Figure 2:
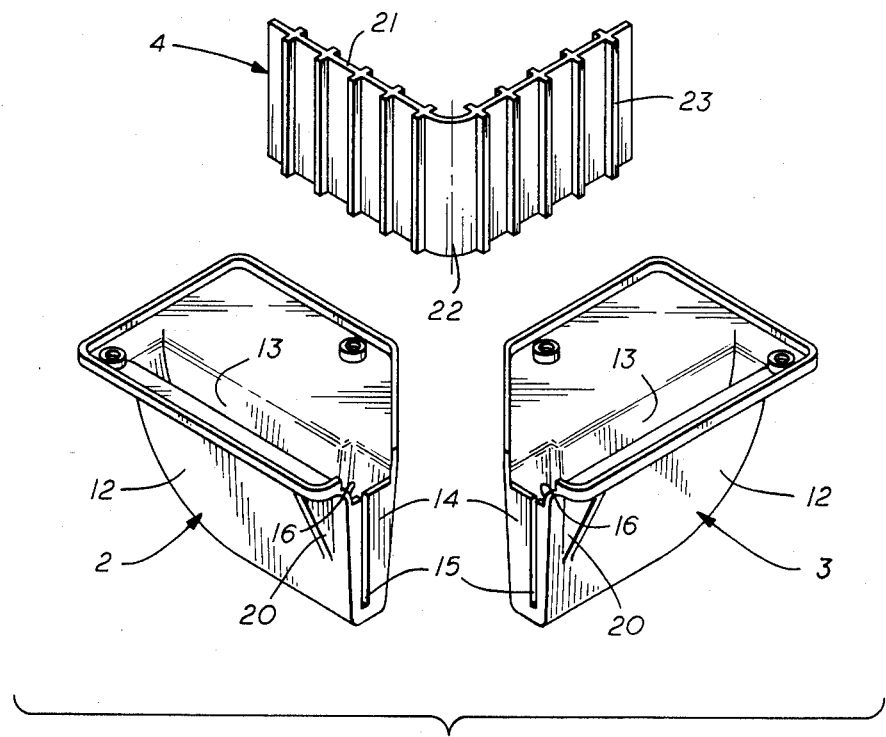
FIG. 2 is a perspective view of the bottom of the mounting chock in the unassembled condition.

With continuing attention to FIG. 2, left mounting element 2 and right mounting element 3 and spacing attachment means 4 are each preferably formed by injection molding. The selection of a plastic material is well known by those skilled in injection molding. Suitable plastic materials are polyethylene or polypropylene and other plastics blended with these materials or polystyrene or polycarbonate, or any other plastic material which have suitable molding and performance characteristics. These members may also be formed by compression molding or vacuum forming, or by any other suitable process which may employ non-plastic materials or manufactured without molding.

Figure 4:
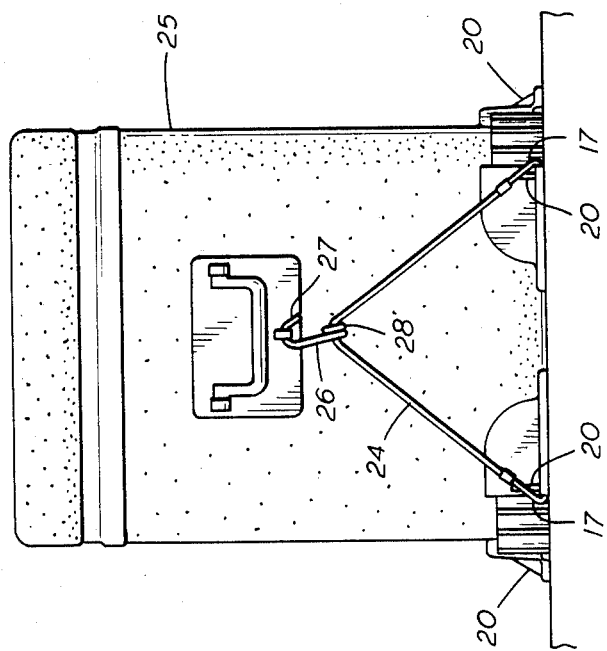
FIG. 4 is a side view of the mounting chock system applied to an ice chest.
Figure 3:
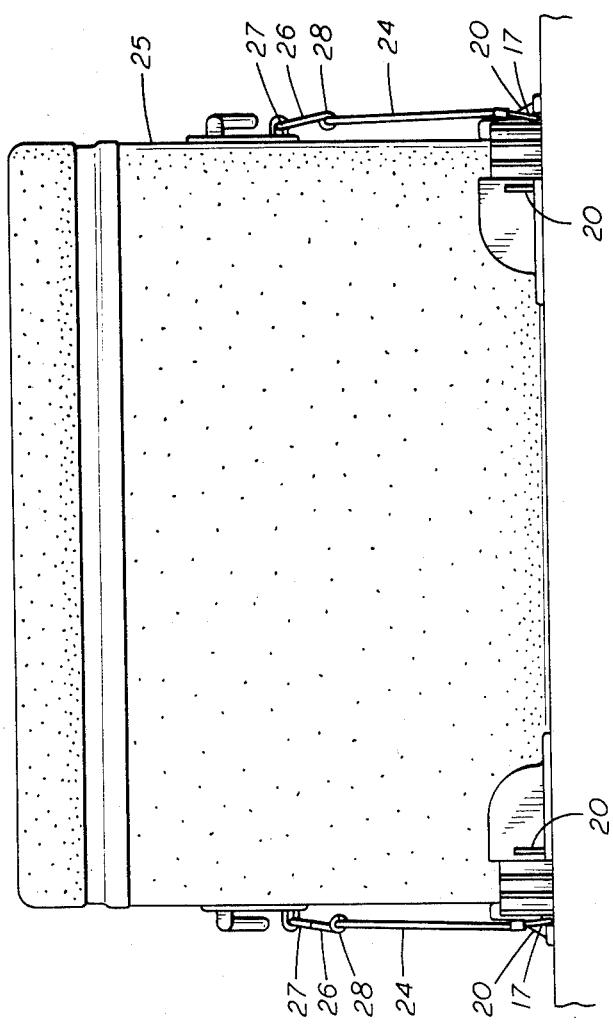
FIG. 3 is a front view of the mounting chock system applied to an ice chest.

With continuing attention to the drawings, FIG. 3 shows a mounting system for a generally rectilinear object which includes at least a pair of mounting chocks 1 and at least one securing elements 24 which secures the mounted object 25. A mounting hook 26 comprised of hook 27 and sliding member 28 engages the mounted object 25, anchoring the mounted object 25 to the floor or deck. FIG. 4 shows a side view of this same mounting system, disclosing in detail the mounting system. For the rectangular object, four mounting chocks 1 and two securing elements 24 are used. The mounting chocks 1 are located at the corners of the mounted object 25, and the securing elements 24 are attached to adjacent mounting chocks 1 and are also engaged by the mounting hook 26 with the mounted object 25.

As can be understood from the drawings and description of the preferred embodiment, the present invention allows for new and unique mounting capabilities and applications for mounting chocks. The use of a thin body spacing attachment means to position the the mounting elements of the mounting chocks of the present invention allows for greater flexibility in mounting configurations and therefore greater flexibility in what can be mounted. The limiting constraint of the prior art whereby the right and left mounting member were a fixed length from each other along a center bend section is overcome by the thin body spacing attachment means. Further, the ability to bend the assembled mounted chock with the mounting elements some distance away from the center bend axis likewise allows greater flexibility in mounting applications. Finally, the ribbon slot system of mounting alignment provides easy assembly and configuration control.

Although I have shown only a few embodiments of my invention, it will be apparent to those skilled in the art that this invention may be used in many applications and embodiments without departing from the scope and spirit of my invention.

I claim:
1. A mounting chock comprising:
   a right mounting element, having element anchoring means and limiting means,
   a left mounting element, having element anchoring means and limiting means, and a mirror image in the vertical plane of the right mounting element,
   a spacing attachment means, wherein said spacing attachment means is flexible at its center, such that it may be bent so that the included angle is from les than 90° to approximately 180°, for linking said left and right mounting elements,
   said right and left mounting elements each having a vertical attachment face, and a slot in said face, said slot sized to accept the thickness of the attachment means, and
   said spacing attachment means having at least one pair of vertical ribbing, said vertical ribbing to be positioned inside said slot of each mounting element.
2. The mounting chock of claim 1, wherein said spacing attachment means is constructed of a bendable material and angled at the apex the ribs extending in equal pairs from said apex.
3. A mounting system which comprises:
   a plurality of mounting chocks, each mounting chock comprising:
   a right mounting element, having element anchoring means and limiting means,
   a left mounting element, having element anchoring means and limiting means, and a mirror image in the vertical plane of the right mounting element,
   a spacing attachment means, wherein said spacing attachment means is flexible at its center, such that it may be bent so that the included angle is from less than 90° to approximately 180°, for linking said left and right mounting elements, and
   said right and left mounting elements each having a vertical attachment face, and a slot in said face, said slot sized to accept the thickness of the attachment means, and
   said spacing attachment means having at least one pair of vertical ribbing, said vertical ribbing to be positioned inside said slot of each mounting element,
   at least one securing element anchored at each end to a mounting chock, and securing the mounted object.
4. The mounting system of claim 3 wherein said mounting elements contain a hook slot.
5. The mounting system of claim 4 wherein said securing element engages said chocks with a securing hook engaged in said hook slots.
6. The mounting system of claim 3 wherein said securing element is an elastic material.
7. The mounting system of claim 3 wherein said securing element has a mounting hook comprising a hook and a sliding member, said sliding member slidably engaging said securing element and said hook engaging the mounted object.
8. A mounting chock comprising:

a right mounting element, having element anchoring means and limiting means, a left mounting element, having element anchoring means and limiting means, and a mirror image in the vertical plane of the right mounting element, and a spacing attachment means for linking left and right mounting elements, wherein said spacing attachment means has vertical ribbing, said ribbing spaced in equal pairs from the mid-point of said attachment means, and said right mounting element and left mounting element having a vertical attachment face and a slot in said face, said slot sized to accept the thickness of the attachment means, but thinner than the thickness of the attachment means ribbing.

9. A mounting chock of claim 8, wherein said spacing attachment means is constructed of a bendable material and angled at the apex the ribs extending in equal pairs from said apex.

* * * * *